(12) United States Patent
Tanide et al.

(10) Patent No.: US 6,201,516 B1
(45) Date of Patent: Mar. 13, 2001

(54) PROJECTOR, PROJECTING SYSTEM, SYSTEM FOR SENSATION AND METHOD OF MANUFACTURING TRANSLUCENT SCREEN

(75) Inventors: Hideo Tanide, Yokohama; Tetsu Ohishi; Hiroki Yoshikawa, both of Hiratsuka, all of (JP)

(73) Assignee: Hitachi, Ltd, Tokyo (JP)

( * ) Notice: Subject to any disclaimer, the term of this patent is extended or adjusted under 35 U.S.C. 154(b) by 0 days.

(21) Appl. No.: 08/951,293

(22) Filed: Oct. 16, 1997

(30) Foreign Application Priority Data

Oct. 21, 1996 (JP) .................................................. 8-277703
Jul. 7, 1997 (JP) .................................................. 9-181188

(51) Int. Cl.$^7$ ........................................................ G09G 5/00
(52) U.S. Cl. ................................................ 345/7; 353/30
(58) Field of Search ........................... 345/7, 8, 9, 4, 345/5, 6; 353/30; 434/37, 38, 40, 43, 44, 47, 57, 21, 247, 307; 348/123; 359/460

(56) References Cited

U.S. PATENT DOCUMENTS 3,779,630 * 12/1973 Clausen et al. ........................ 359/460
4,879,849 * 11/1989 Hollingsworth ......................... 52/10

* cited by examiner

Primary Examiner—Xiao Wu
(74) Attorney, Agent, or Firm—Antonelli, Terr, Stout & Kraus

(57) ABSTRACT

In a description and drawings of the present application disclosed are, as the invention, (1) a projector for projecting an optimum image face having a convex configuration at a side of the projector, (2) a projecting system provided with the projector and a translucent screen with a substantially spherical configuration on which an image from the projector is formed, (3) a system for sensation provided with the projecting system, a seat at which a viewer is seated, a motion drive device for displacing the seat, a motion control device for controlling operation of the motion drive device, and an image control device for controlling an image projected by the projector while instructing the motion drive device to displace the seat in accordance with a change in the image, and (4) a method of manufacturing a screen provided with a light diffusing layer forming step of warming and softening a transparent thermoplastic resin sheet including a particle of a light diffusion material and pressing a light transmitting layer with a convex configuration against the thermoplastic resin sheet to closely fix thereto.

14 Claims, 12 Drawing Sheets

| CURVATURE RADIUS 1/H (mm) OF IMAGE DISPLAY FACE 17 | CURVATURE RADIUS 1/L (mm) OF IMAGE DISPLAY FACE 17B OF PROJECTION LENS 18 FOR FLAT SCREEN | CURVATURE RADIUS 1/S (mm) OF SPHERICAL SCREEN 10 |
|---|---|---|
| R350 | R600 | R1100~R1650 |
| R350 | FLAT FACE (∞) | R450~R700 |
| R600 | FLAT FACE (∞) | R800~R1200 |

PROJECTOR, PROJECTING SYSTEM, SYSTEM FOR SENSATION AND METHOD OF MANUFACTURING TRANSLUCENT SCREEN

BACKGROUND OF THE INVENTION

The present invention relates to a projecting system for forming an image on a screen, especially to a technique for use in a simulator, a game equipment, a virtual reality equipment and the like for providing an image with a high feeling of presence to a viewer.

Recently, in this type of device, there is a rapidly increasing tendency to a desire for what provides a high feeling of presence. For this, an image providing a feeling of absorption is demanded, while there is a desire for a seat or the like driven to operate in accordance with an image, or a motion of an image operated interactively by a viewer.

As a projecting system giving a feeling of absorption or presence available is a HMD (head mounting display) which is a projecting system for one person. In the HMD, a small display is positioned immediately in front of viewer's eyes. An image on the display is enlarged by an optical system, so that a large virtual image of a remote object is shown to a viewer. In the system, since viewer's eyes are covered, the viewer cannot see anything but the image, and can be given a feeling of absorption. In the HMD, when a direction of a sight line or viewing direction is changed by shaking a head, the image projected on the display also is changed in accordance with the movement of the head, thereby providing an image of 360 degrees. Further, the HMD is advantageously small-sized. Such a projecting device is disclosed in, for example, the Japanese Patent Unexamined Publication No. 04-168489.

In addition to the HMD, as another method of providing an image having a feeling of absorption, a method of covering a visually recognized range of a viewer with a screen is available. To realize this method, a method of installing a projector for enlarging and projecting an image on a screen opposite to a viewer with respect to the screen or a method of installing the projector at the same side as the viewer with respect to the screen is available.

As a conventional method of installing the projector at the side opposite to the viewer with respect to the screen, for example, a projecting system with a cubic screen called CAVE is heretofore available (Virtual Reality, authored by Michitaka Hirose, Sangyo Tosho, p101). In this CAVE, four rear projection screens with about 3 m sides are disposed for use in such a manner that the respective screens have an almost right angle relative to one another and are positioned in front, left, right and lower directions, respectively, and each screen is provided with a projector. Additionally, other methods are described in the Japanese Patent Unexamined Publications No. 5-197329 and No. 6-503906. In either of these, several flat rear projection screens are used, and each face is provided with a projector.

Also, in a conventional method of installing the projector at the same side as the viewer with respect to the screen, a reflective screen having a spherical configuration and a projector using a fisheye lens are used. The spherical reflective screen is usually constituted by using small spherical screen parts and assembling them up into a spherical screen.

Generally, a range of sight which can be recognized without moving a head and by hardly moving eye balls (hereinafter, referred to as the visually recognized range) is said to be about 120° both in horizontal and vertical directions when left and right eyes are used. A range of sight which can be recognized without moving the head and by moving the eye balls (hereinafter, referred to as the sight range) is said to be about 240° in the horizontal direction and about 180° in the vertical direction when either one of the eyes is used. An image which can cover the visually recognized range of both eyes can remarkably provide a feeling of presence. In either of the aforementioned conventional methods of covering the sight range of a viewer with the screen, a screen with a size of 120° or more centering on the viewer is used, which can sufficiently cover the visually recognized range of the viewer. Further, in the HMD, since an image range is about from 60° to 80°, there easily arises a puppet theater effect in which an image is felt small. However, since the sight range is completely covered, a feeling of absorption is remarkably provided.

However, in the HMD, when a viewer changes a direction of a sight line by moving his head, a change in an image on a display causes a time lag relative to movement of the head. There is a problem that the viewer has a strange feeling in the image so as to spoil the feeling of presence. Further, since the HMD is mounted on the viewer's head, the oppression on the head causes a strange feeling. Additionally, there is a problem that cleanliness can hardly be kept for use by another viewer.

On the contrary, in the method of covering the visually recognized range of a viewer with the screen, even when the viewer changes a direction of a sight line, an image always exists also in the changed direction of a sight line, thereby causing no time lag in the image. Further, since no device is mounted on the viewer's head, the oppression on the head is not produced. This is furthermore preferable in respect of hygiene. Specifically, the method of covering the visually recognized range of the viewer with the screen causes no problem the HMD has. However, even this method has the following problems.

In the method of covering the visually recognized range of the viewer, when the projector is installed at the same side as the viewer with respect to the screen, the projector, in addition to the viewer, is disposed inside the screen. Therefore, if the projector is not disposed at a position which does not obstruct the screen from the viewer, a feeling of presence will be spoiled. Especially, if the viewer and the projector are disposed in a small-sized screen with a diameter of about 5 m which is supposedly a limitation in size able to be housed inside a generally commercial building, then the projector itself obstructs the range of a sight line of the viewer. Additionally, there is a case that the image to be projected on the screen from the projector is obstructed by the viewer himself. In this case, a feeling of presence is spoiled. Further, a spherical screen is usually formed by assembling divided parts. A problem is that the joint portion of the screen can be seen by the viewer, thereby spoiling a feeling of presence.

Further, when the projector is installed opposite to the viewer with respect to the screen, in either of the aforementioned prior arts, nothing obstructs a sight line of the viewer inside the cubic screen. However, since a large number of flat screens are assembled, each boundary line between the screens forms a mathematically discontinuous portion (bent portion). A problem is that the viewer recognizes discontinuity in an image with the discontinuous portions of the screen, and a feeling of presence is spoiled.

SUMMARY OF THE INVENTION

An object of the invention is to solve the problems in the aforementioned prior art, and to provide a projector constituted not to obstruct the visually recognized range of a viewer, a projecting system giving continuity in an image and a high feeling of presence, a system for sensation provided with the projecting system and a method of manufacturing a screen used in the system for sensation. Incidentally, the system for sensation is defined as a system giving a feeling of virtual experience.

To attain the above objects, the present invention provides a projector which is constituted in such a manner that a projected optimum image plane has a convex configuration at a side of the projector. Further, a projecting system comprises the above projector and a substantially spherical translucent screen on which an image from the projector is formed. Moreover, a system for sensation comprising the above projecting system is provided with a seat at which a viewer is seated, a motion drive device for displacing the seat, a motion control device for controlling operation of the motion drive device, and an image control device for controlling an image projected by the projector and instructing the motion drive device to displace the seat correspondingly to changes in the image. Furthermore, a method of manufacturing a screen for use in the above system for sensation includes a light diffusing layer forming process of warming and softening a transparent thermoplastic resin sheet including a particle of a light diffusion material and pressing and closely fixing a light transmitting layer with a convex configuration onto the thermoplastic resin sheet.

In such a constitution, since the projector is positioned out of the substantially spherical translucent screen, the sight range of the viewer is not obstructed, and the viewer can see an image extended beyond the visually recognized range of the viewer. Further, since an image is projected in various directions, there arises no time lag in the image relative to changes of a direction of viewing sight of the viewer, even if the viewer changes a viewing direction. Further, since the substantially spherical translucent screen is mathematically continuous, an image projected on the screen can also obtain continuity. Furthermore, since the projector for a three-dimensionally curved translucent screen is used, a continuous image clear to all corners can be formed.

DETAILED DESCRIPTION OF THE PREFERRED EMBODIMENT

In the following, various embodiments of a system for sensation according to the present invention are described with reference to accompanying drawings. When describing various embodiments, the same portion is denoted with the same code, and an overlapped description is omitted.

A first embodiment of a system according to the invention is now described using FIGS. 1 to 7.

Figure 1:
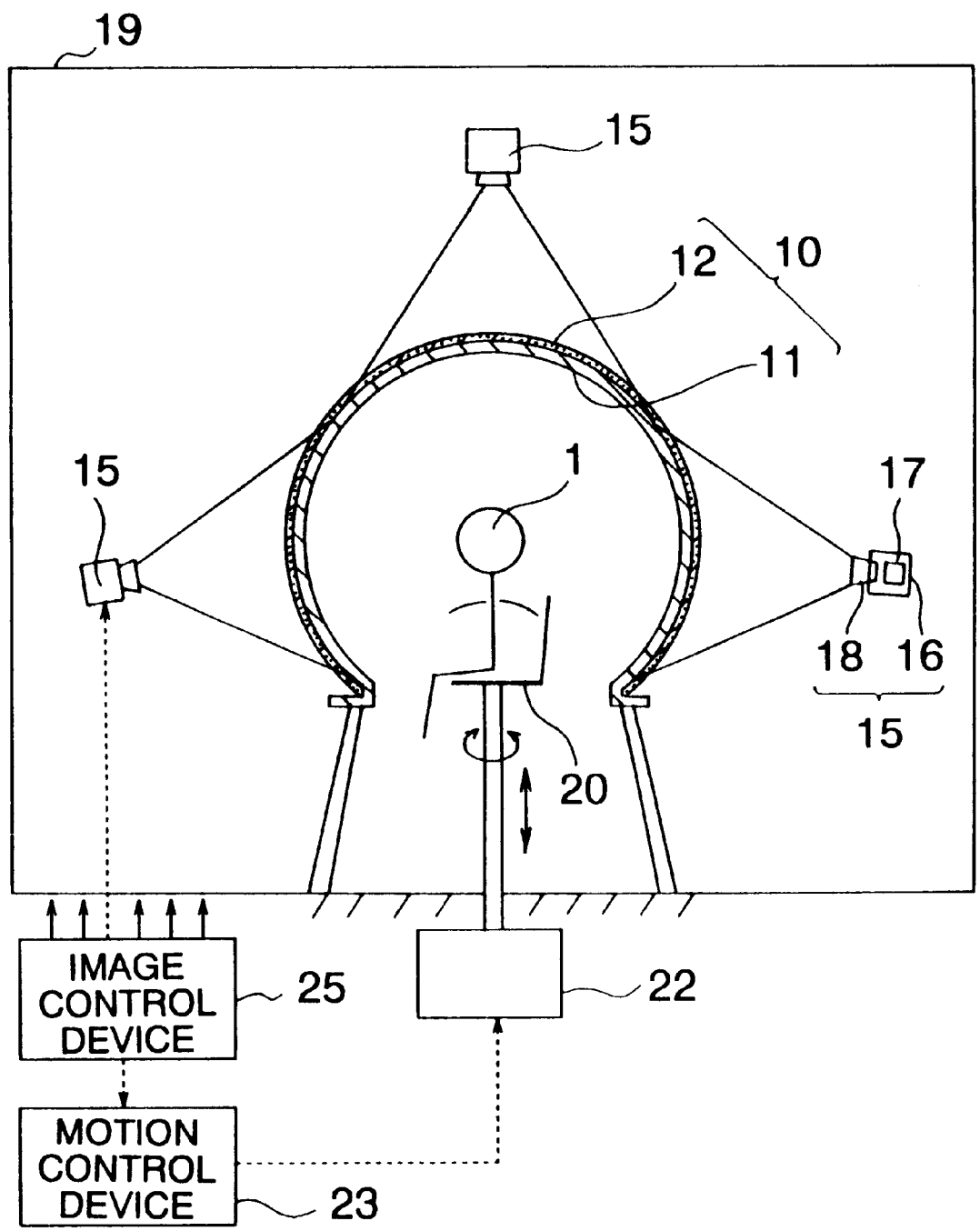
FIG. 1 is a constitutional explanatory view of a system for sensation according to a first embodiment of the present invention.

The system of the embodiment is, as shown in FIG. 1, provided with a translucent screen 10, a plurality of projectors 15 disposed opposite to a predetermined position of a viewer with respect to the translucent screen 10, an image control device 25 for controlling respective images projected by the projectors 15, an outer frame 19 for covering the translucent screen 10 and the projectors 15, a seat 20 disposed at the viewer's predetermined position, a motion drive device 22 for moving the seat 20 and a motion control device 23 for controlling the motion drive device 22. In the embodiment, the translucent screen 10, the projectors 15, the image control device 25 and the seat 20 constitute a projecting system. Further, in the embodiment, the translucent screen 10 is substantially spherical, and the viewer's predetermined position is set at or in the vicinity of the center of the curvature of the substantially spherical translucent screen 10.

The translucent screen 10 is developed from the viewer's predetermined position as a center point at 360° in a horizontal plane and at 180° or more in a vertical plane and forms a mathematically continuous, substantially spherical configuration. The term "mathematically continuous" means that there is no bent portions. The translucent screen 10 has a light transmitting layer 11 formed of a colored transparent synthetic resin sheet into a substantially spherical configuration, and on an outer peripheral face of the light transmitting layer 11 a light diffusing layer 12 formed of a transparent synthetic resin sheet including a light dispersing agent into a substantially spherical configuration.

Figure 2:
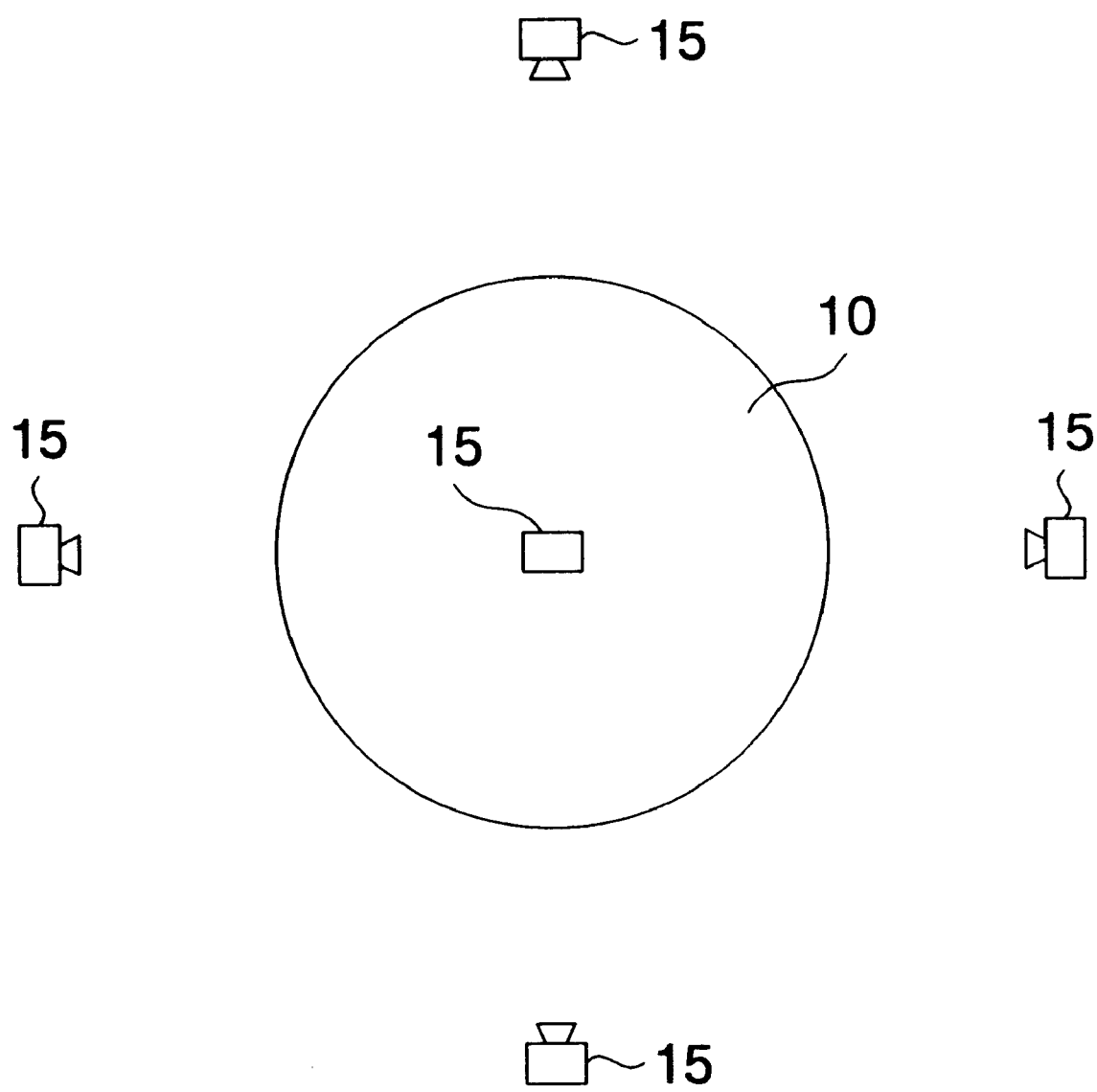
FIG. 2 is an explanatory view showing arrangement of projectors in the system for sensation according to the first embodiment.

In the embodiment, as shown in FIGS. 1 and 2, five projectors 15 are used. The projectors 15 are disposed at the side opposite to the viewer's predetermined position with respect to the translucent screen 10. Specifically, around the outer periphery of the substantially spherical translucent screen 10, four projectors are disposed at an interval of 90° in the horizontal plane with respect to the viewer's predetermined position and one projector is disposed vertically above the viewer's predetermined position. The number of projectors 15 is determined by a projecting size of one projector 15 on the translucent screen 10. Since the projecting size depends on an enlargement ratio and a projecting distance of the projector 15, the size may be appropriately determined by these values. For example, when the outer frame 19 needs to be reduced for reasons in installation environment and thus the projecting distance needs to be reduced, the number of the projectors 15 will be increased.

Figure 3A:
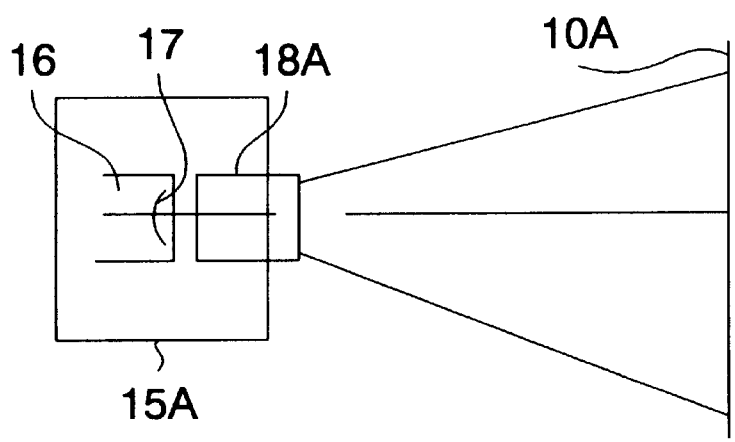
FIGS. 3A to 3C are explanatory views showing constitutions of the projectors in the system for sensation according to the first embodiment.
Figure 3B:
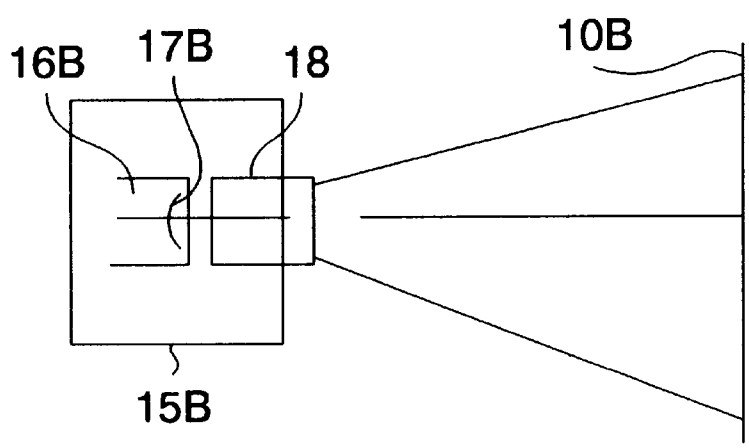
Figure 3C:
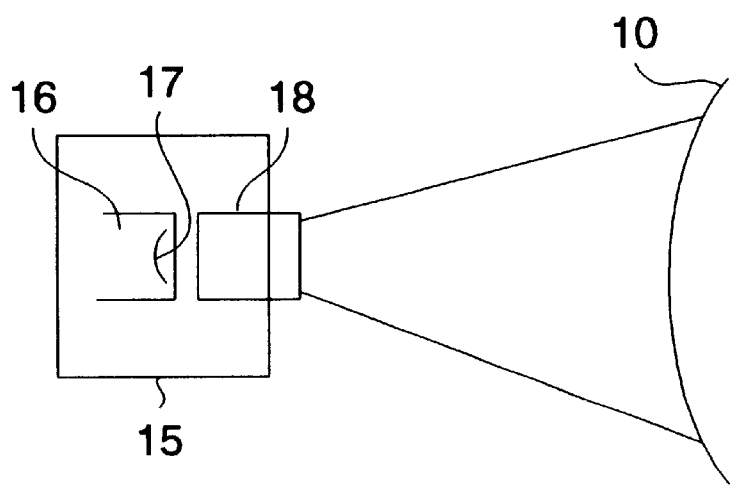

Each projector 15 is, as shown in FIG. 3C, provided with an image source 16 having an image display face 17 on which an image is displayed, and a projecting lens 18 for enlarging the image projected on the image display face 17 to form an image on the light diffusing layer 12 of the translucent screen 10. Further, as shown in FIGS. 3A and 3B, projectors 15A and 15B for usual plane reflective screens 10A and 10B have image sources 16 and 16B having image display faces 17 and 17B on which an image is displayed, and projecting lenses 18A and 18 for enlarging the images projected on the image display faces 17 and 17B to form images on light diffusing layers of the translucent screens 10A and 10B, respectively. In the embodiment, specifically, the image source 16 is a projecting tube, and the image display face 17 is a fluorescent screen of the projecting tube.

Here, we will assume the following matters: The image display face 17 of the image source 16 shown in FIG. 3A and the image display face 17B of the image source 16B shown in FIG. 3B have a concave configuration relative to the projecting lenses 18A and 18, respectively, and the curvature of the image display face 17 in FIG. 3A is larger than the curvature of the image display face 17B. In other words, the curvature radius of the image display face 17 is smaller than the curvature radius of the image display face 17B. Specifically, the curvature radius of the image display face 17 in FIG. 3A is 350 mm, and the curvature radius of the image display face 17B in FIG. 3B is 600 mm. Also, the projecting lens 18A of the projector 15A shown in FIG. 3A forms an image on the image display face 17 with the curvature radius of 350 mm on the flat reflective screen 10A, and the projecting lens 18 of the projector 15B shown in FIG. 3B forms an image on the image display face 17B with the curvature radius of 600 mm on the flat reflective screen 10B.

As aforementioned, the projector 15A shown in FIG. 3A and the projector 15B shown in FIG. 3B form images on the flat screens 10A and 10B, respectively. Therefore, when these projectors 15A and 15B are applied to the substantially spherical screen 10, an object image is not precisely formed at a peripheral portion of the image. Specifically, when to the substantially spherical screen 10, the usual projectors 15A and 15B are applied, an image which is clear to all corners cannot be formed. Therefore, inventors of the present application have found as a result of their earnest studies that by combining the image source 16 with the image display face 17 having a small curvature radius used in the projector 15A shown in FIG. 3A and the projecting lens 18 for forming an image projected on the image display face 17B with a large curvature radius on the flat screen 10B used in the projector 15B shown in FIG. 3B, then, on the substantially spherical screen 10, an image which is clear to all corners can be formed. Specifically, it is found that when the image source 16 with the image display face 17 having a curvature radius 1/H (H being the curvature) and the projecting lens 18 for forming an image projected on the image display face 17B having a curvature radius 1/L (L being the curvature) on the flat screen are combined, then, an image which is clear to all corners can be formed on the spherical screen 10 with a curvature radius 1/S (S being the curvature) which satisfies the relationship shown in following Expression 1.

$$S = A \times (H - L)$$ (Expression 1)

In the equation, H is larger than L and A is a constant within a range of 0.50 to 0.78.

Figures 4, 5:
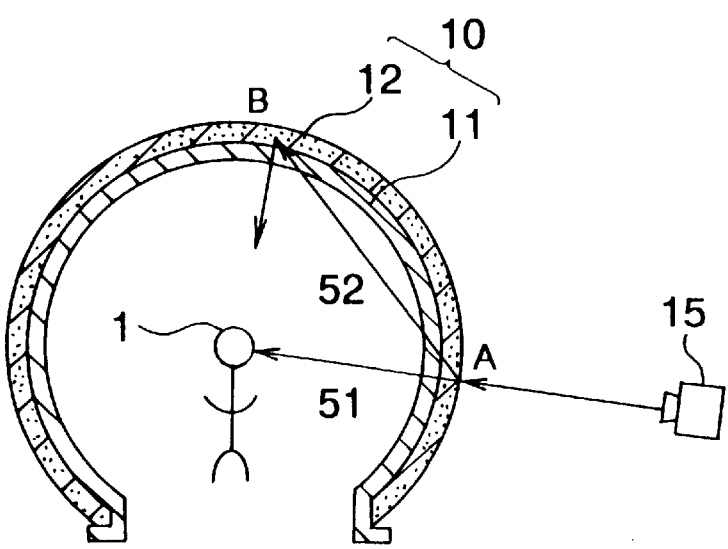
FIG. 4 is an explanatory view showing a curvature radius of a translucent screen, when a projecting source having an image display face with a certain curvature radius and a projecting lens for forming an image projected on the image display face with the certain curvature radius on a flat screen are combined in the projector of the system for sensation according to the first embodiment.
FIG. 5 is an explanatory view showing an effect of a light transmitting layer in the translucent screen according to the first embodiment.

For example, as shown in the embodiment of FIG. 3C, by combining the image source 16 with the image display face 17 having a curvature radius of 350 mm and the projecting lens 18 for forming on the flat screen an image projected on the image display face 17 with a curvature radius of 600 mm, then an image which is clear to all corners can be formed on the spherical screen 10 with a curvature radius of 1100 mm to 1650 mm. Further, as shown in FIG. 4, when an image source with the image display face having a curvature radius of 350 mm and the projecting lens for forming on a flat screen an image projected on the image display face with a curvature radius of ∞, i.e. a flat image display face, are combined, then an image which is clear to all corners can be formed on a spherical screen with a curvature radius of 450 mm to 700 mm. Also, when an image source with an image display face having a curvature radius of 600 mm and a projecting lens for forming on a flat screen an image projected on the image display face with a curvature radius of ∞, i.e. a flat image display face, are combined, then an image which is clear to all corners can be formed on a spherical screen with a curvature radius of 800 mm to 1200 mm.

As aforementioned, the curvature radius of the spherical screen has a range, because an image face does not completely coincide with a spherical face due to a spherical aberration, and a difference in curvature radius is caused by a height of an image to which importance is attached, when the image face is turned back to the spherical face.

Further, in the embodiment, as the image source 16 a projecting tube is used, and its fluorescent screen is used as the image display face 17. Alternatively, even when a display panel face of a liquid crystal panel or a film of a general projector is used as the image display face, an image which is clear to all corners can be formed on a spherical screen as long as the relationship in Expression 1 is satisfied.

The outer frame 19, as shown in FIG. 1, covers and protects the substantially spherical translucent screen 10 and the projectors 15 from external light. In this manner, by interrupting the external light, contrast in an image projected on the substantially spherical translucent screen 10 can be prevented from deteriorating.

The motion drive device 22 moves the seat 20 in a vertical direction, while rotating the seat 20 around a vertical axis. Further, the motion drive device 22 of the embodiment has two degrees of freedom. Alternatively, several degrees of freedom can be added.

The image control device 25 distributes an image projected all over the translucent screen 10 to each projector 15, so that the images from the respective projectors 15 are continuous with one another without any clearance on the translucent screen 10. In other words, the image control device 25 outputs an image signal to each projector 15, so that the entire image projected by each projector 15 on the substantially spherical translucent screen 10 is continuous and integral. For connection of images from the respective projectors 15, the images from the respective projectors 15 can be connected with one another partially overlapped, or boundary lines of images of the projectors 15 can be completely aligned with one another. The image control device 25 also has a function of informing the motion drive device 22 of the predetermined movement of the seat 20 in accordance with an image to be projected on the translucent screen 10.

Operation and action of the system for sensation in the embodiment are now described.

First, a viewer 1 is seated at a seat 20 in the substantially spherical translucent screen 10. Subsequently, the system for sensation is activated. The image control device 25 transmits an image signal to each projector 15, and each projector 15 forms an image corresponding to each image signal on the light diffusing layer 12 of the translucent screen 10. As a result, on the substantially spherical translucent screen 10, a continuous and integral image is projected. Also, as aforementioned, an image from each projector 15 is formed clear to all corners on the translucent screen 10. The viewer 1 sees via the light transmitting layer 11 the image formed on the light diffusing layer 12 of the translucent screen 10.

Here, an effect of the colored transparent light transmitting layer 11 constituting the translucent screen 10 is described with reference to FIG. 5.

An image from the projector 15 is formed on the light diffusing layer 12 of the translucent screen 10, and advances as it is in a direction (of a main beam) 51 of the viewer 1, while extending in various directions in the light diffusing layer 12. An unnecessary beam 52 is one of such beams, and decreases contrast at point B on the translucent screen 10. Therefore, in the embodiment, by forming the light transmitting layer 11 of the translucent screen 10 of a slightly colored transparent member, a decrease in contrast is improved. Since the light transmitting layer 11 is formed inside the light diffusing layer 12, the unnecessary beam 52 from point A in the light diffusing layer 12 passes the light transmitting layer 11 twice until reaching the point B in the light diffusing layer 12. In this manner, the unnecessary beam 52 is diminished while passing twice the light transmitting layer 11. Therefore, the decrease in contrast because of the unnecessary beam 52 can be prevented.

For example, a case that light is radiated twice vertically to a colorless transparent member (transmittivity of 0.95) and another case that light is done so to a colored transparent member (transmittivity of 0.5) are compared. When an intensity of light before passing through the respective transparent members is set as 1, a light intensity becomes 0.9 when light passes twice through the colorless transparent member. When light passes twice through the colored transparent member, a light intensity becomes 0.25. The intensity is about one fourth of that of light when passing the colorless transparent member. For the unnecessary beam 52, since its incident angle to the spherical light transmitting layer 11 is not necessarily vertical, it cannot be said definitely that the intensity of light having passed twice through the light transmitting layer 11 is one fourth of the original intensity. However, by forming the light transmitting layer 11 of the colored transparent member, a drop in contrast from the viewer's position can be remarkably prevented. In the embodiment, only a colored transparent synthetic resin sheet forms the light transmitting layer 11. However, even when the light transmitting layer is formed of a colorless transparent resin sheet and a colored transparent resin sheet attached to the outer surface of the colorless sheet, the same effect can be obtained.

The image control device 25 outputs an image signal to each projector 15, while outputting a drive control signal to the motion control device 23. The motion control device 23 receives the drive control signal and outputs a motion signal to the motion drive device 22. As a result, the seat 20 at which the viewer 1 is seated vertically moves and/or horizontally rotates synchronously when the image projected on the substantially spherical translucent screen 10 changes.

As aforementioned, in the embodiment, the projectors 15 are positioned at the outer peripheral side of the substantially spherical translucent screen 10, and the substantially spherical translucent screen 10 is developed at 360° horizontally and at 180° or more vertically with respect to the viewer 1 positioned at the inner peripheral side of the screen 10. Therefore, without interrupting the sight range of the viewer 1, an image extended beyond the visually recognized range of the viewer 1 can be shown to the viewer 1. Whether the viewer 1 sees or does not see, an image is projected in either direction. Therefore, even when the viewer 1 moves his head and changes a viewing direction, no time lag is produced in an image in response to a change in the viewing direction of the viewer 1, which is different from that in the HMD. Also, in the embodiment, since the substantially spherical translucent screen 10 is mathematically continuous and has no bent portions, an image projected on the screen 10 can secure a continuity. Further, since the projector 15 for the three-dimensionally curved screen 10 is used, the viewer 1 can see an image which has a continuity and is clear to all corners. In this manner, according to the embodiment, the viewer is given an image which has a continuity, is clear to all corners and extended beyond the visually recognized range of the viewer 1, without interrupting the sight range of the viewer 1. Further, completely synchronously with the image projected on the translucent screen 10, the seat 20 of the viewer 1 moves, so that a remarkably high feeling of presence is imparted to the viewer 1.

Further, in the embodiment, there is one person as the viewer 1. The invention is not restricted to the embodiment. It goes without saying that there can be a plurality of viewers 1. This case requires the same number of seats 20 as the number of the viewers 1. However, since the seats 20 can move in the same manner, only one the motion drive device 22 is sufficient. Also, in this case, the respective positions at which the viewers 1 are actually seated are not the viewer's predetermined position, but the center of the viewers 1 should be the viewers' predetermined position. Also, the image projected by each projector 15 is preferably cubic, because the cubic image further enhances a feeling of presence.

A method of manufacturing the substantially spherical translucent screen 10 according to the embodiment is now described using FIGS. 6A to 6F and FIGS. 7A to 7F. In the embodiment, the substantially spherical translucent screen is described. The same can be applied to a translucent screen having a concave configuration.

In the embodiment, the substantially spherical translucent screen 10 is formed in a thermal molding method.

Figure 6A:
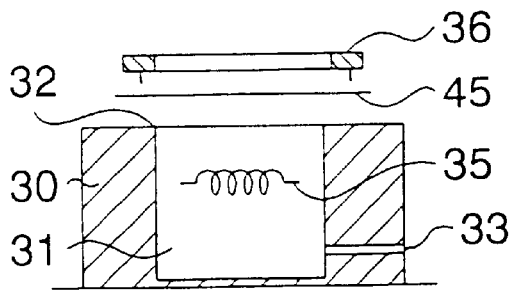
FIGS. 6A to 6F are explanatory views showing a manufacture process of the light transmitting layer in the translucent screen according to the first embodiment.

In the thermal molding method of the embodiment, as shown in FIG. 6A, a chamber 30 with a heater built therein is used. In the chamber 30 formed are a molding space 31 for housing the substantially spherical translucent screen 10 to be molded and a vent hole 33 for introducing gas into or from the molding space 31.

To form the translucent screen 10, first the light transmitting layer 11 on the inner periphery of the translucent screen 10 is molded, and subsequently the light diffusing layer 12 on the outer periphery of the light transmitting layer 11 is molded.

First, as shown in FIG. 6A, a colored transparent thermo-hardening resin sheet 45 for forming the light transmitting layer 11 (hereinafter, referred to as the light transmitting layer forming sheet) is disposed over an upper opening 32 of the molding space 31. Subsequently, on the sheet 45, a flat annular sheet fixing jig 36 is disposed, and fixed on the chamber 30, thereby fixing the light transmitting layer forming sheet 45 on the chamber 30. In this manner, as a result of the upper opening 32 of the molding space 31 closed with the light transmitting layer forming sheet 45, gas can go in or out of the molding space 31 only via the vent hole 33.

Figure 6D:
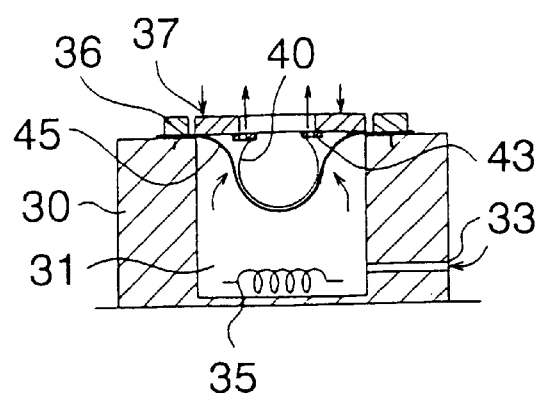
Figure 6B:
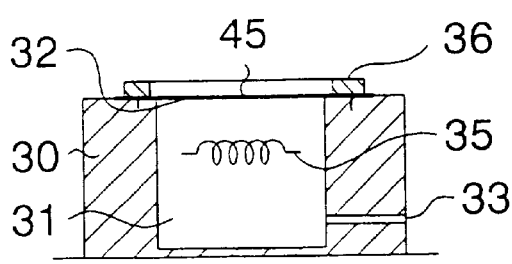

Subsequently, as shown in FIG. 6B, a heater 35 heats inside the molding space 31 and softens the light transmitting layer forming sheet 45.

Figure 6E:
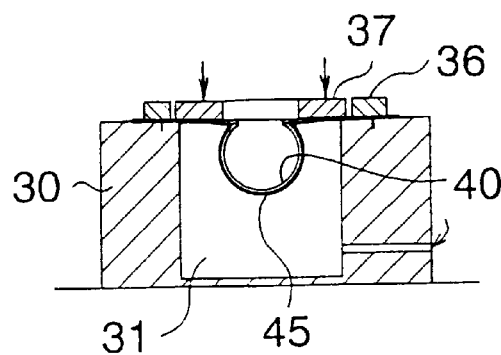
Figure 6C:
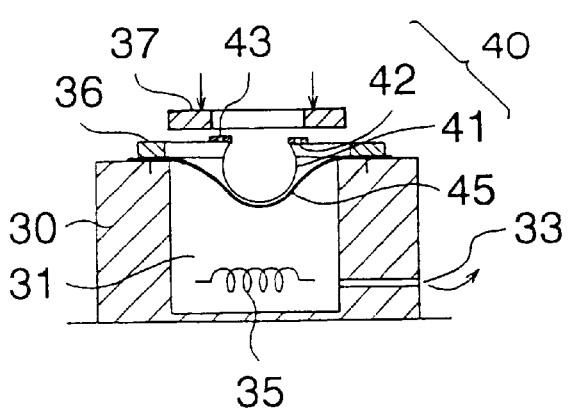
Figure 6F:
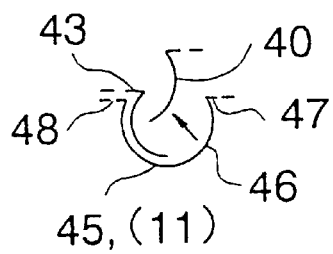

Subsequently, as shown in FIG. 6C, using a flat annular pressing jig 37, a die 40 is pressed from above against the softened light transmitting layer forming sheet 45. The die 40 has a spherical portion 41 with an outer peripheral face correspondingly to an inner peripheral face of the substantially spherical light transmitting layer 11 and a flange portion 42. In the flange portion 42, a plurality of vent holes 43 are formed. Also, the die 40, which is constituted by assembling several pieces, can be disassembled. An inner diameter of the flat annular pressing jig 37 is larger than a pitch circular diameter of the vent holes 43 in the die flange portion 42, and an outer diameter thereof is slightly smaller than an inner diameter of the flat annular sheet fixing jig 36. When pressing the die 40 against the light transmitting layer forming sheet 45, the pressing jig 37 is brought in contact with the die flange portion 42, and moved downward until the pressing jig 37 contacts a top face of the chamber 30 and is contained in an inner peripheral side of the sheet fixing jig 36. In the process, air in the molding space 31 is exhausted outside via the vent hole 33 of the chamber 30.

When the pressing jig 37 is in contact with the top face of the chamber 30 and contained in the inner peripheral side of the sheet fixing jig 36, then, as shown in FIG. 6D, gas is introduced via the vent hole 33 of the chamber 30 into the molding space 31 while the die 40 is pressed with the pressing jig 37, thereby increasing pressure in the molding space 31. The softened light transmitting layer forming sheet 45 is closely attached to the outer peripheral face of the die 40. In this process, air between the light transmitting layer forming sheet 45 and the outer peripheral face of the die 40 is exhausted outside via the vent holes 43 of the die flange portion 42.

After the softened light transmitting layer forming sheet 45 is closely fixed to the outer peripheral face of the die 40, as shown in FIG. 6E, the light transmitting layer forming sheet 45 is left alone for a while, until it cools and hardens.

After the light transmitting layer forming sheet 45 hardens, holes are made in portions of the light transmitting layer forming sheet 45 corresponding to the vent holes 43 of the die flange portion 42, and the die 40 is disassembled. The die 40 is then taken out of the light transmitting layer forming sheet 45 which obtains a spherical configuration. In this manner, the light transmitting layer 11 is formed. Further, the light transmitting layer 11 has a spherical portion 46 and a flange portion 47 in the same manner as the die 40. In the last process, vent holes 48 have been formed in the flange portion 47.

After the light transmitting layer 11 is formed, using the light transmitting layer 11 as a mold, basically in the same manner as aforementioned, the light diffusing layer 12 is formed on an outer peripheral face of the light transmitting layer 11.

Figure 7A:
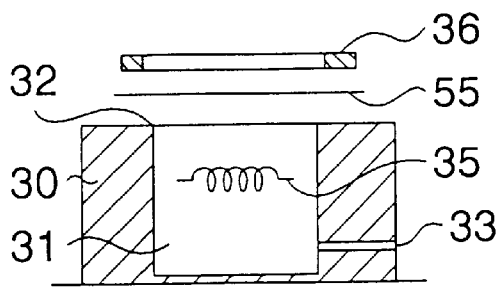
FIGS. 7A to 7F are explanatory views showing a manufacture process of a light diffusing layer in the translucent screen according to the first embodiment.

Specifically, as shown in FIG. 7A, a transparent thermo-hardening resin sheet 55 including a particle of a light diffusion material for forming the light diffusing layer 12 (hereinafter, referred to as a light diffusing layer forming sheet) is disposed over the upper opening 32 of the molding space 31 of the chamber 30 which has been used for forming the light transmitting layer 11. Subsequently, on the sheet 55, the sheet fixing jig 36 which has been used for molding the light transmitting layer 11 is disposed in the same manner, and fixed on the chamber 30, thereby fixing the light diffusing layer forming sheet 55 on the chamber 30.

Figure 7B:
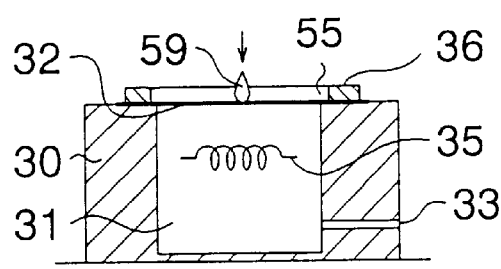

Subsequently, as shown in FIG. 7B, the heater 35 heats inside the molding space 31 and softens the light diffusing layer forming sheet 55. Thereafter, a transparent adhesive 59 is dropped on the softened diffusing forming sheet 55. Although application of the adhesive 59 onto the sheet 55 is preferable, the adhesive 59 does not have to be used.

Figure 7C:
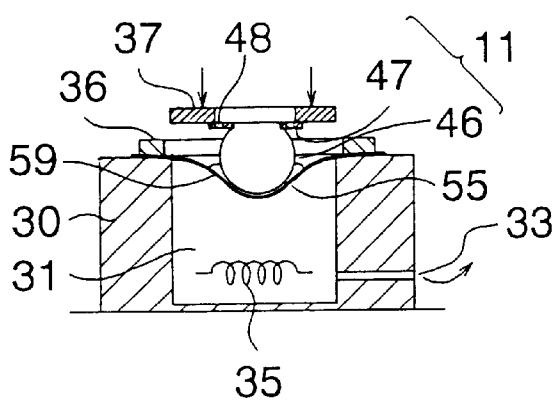

Subsequently, as shown in FIG. 7C, using the flat annular pressing jig 37, the substantially spherical light transmitting layer 11 is pressed from above against the softened light diffusing layer forming sheet 55. When pressing the light transmitting layer 11 against the light diffusing layer forming sheet 55, the pressing jig 37 is brought in contact with the flange portion 47 of the light transmitting layer 11, and moved downward until the pressing jig 37 contacts the top face of the chamber 30 and is contained on the inner peripheral side of the sheet fixing jig 36. In the process, air in the molding space 31 is exhausted outside via the vent hole 33 of the chamber 30.

Figure 7D:
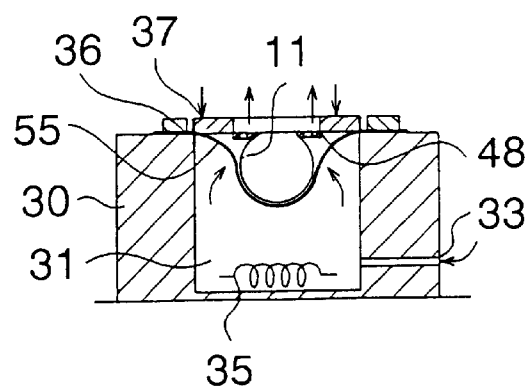

When the pressing jig 37 is in contact with the top face of the chamber 30 and contained on the inner peripheral side of the sheet fixing jig 36, then, as shown in FIG. 7D, gas is introduced via the vent hole 33 of the chamber 30 into the molding space 31, while the substantially spherical light transmitting layer 11 is pressed with the pressing jig 37, thereby increasing pressure in the molding space 31. The softened light diffusing layer forming sheet 55 is closely attached to the outer peripheral face of the light transmitting layer 11. In this process, air between the light diffusing layer forming sheet 55 and the outer peripheral face of the light transmitting layer 11 is exhausted outside via the vent holes 48 of the light transmitting layer flange portion 47.

Figure 7E:
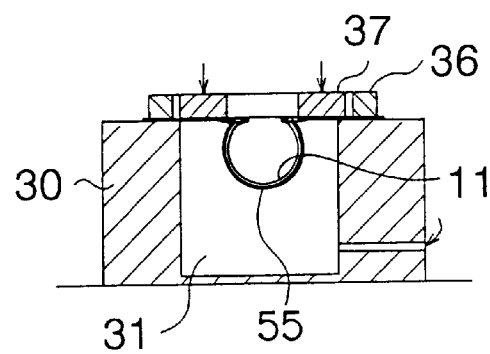

After the softened light diffusing layer forming sheet 55 is closely fixed to the outer peripheral face of the light transmitting layer 11, as shown in FIG. 7E, the light diffusing layer forming sheet 55 is left alone for a while, until it cools and hardens together with the adhesive 59.

Figure 7F:
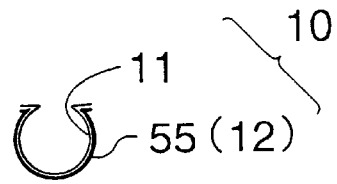

After the light diffusing layer forming sheet 55 and the adhesive 59 harden, as shown in FIG. 7F, the substantially spherical translucent screen 10 with the light diffusing layer 12 formed on the outer periphery of the light transmitting layer 11 is completed. Further, by making holes in portions of the light diffusing layer 12 corresponding to the vent holes 48 of the light transmitting layer flange portion 47, the holes in the flange portions of the respective layers can be used as bolt holes in which the translucent screen 10 is installed.

Further, in the embodiment, the translucent screen 10 is squeezed at the flange portion side. However, for example, as described later and shown in FIG. 10, when the flange portion side of the translucent screen is not much squeezed, without executing the step of introducing gas into the molding chamber to increase the pressure in the molding chamber, the light transmitting layer and the light diffusing layer can be adhered to each other. Also, in the embodiment, both the light transmitting layer and the light diffusing layer are molded in the thermal molding method, but the invention is not restricted to this. For example, the light transmitting layer can be molded in a blow molding method or an injection molding method. The light diffusing layer can be formed using a transparent paint including a particle of a light diffusion material.

Figure 8:
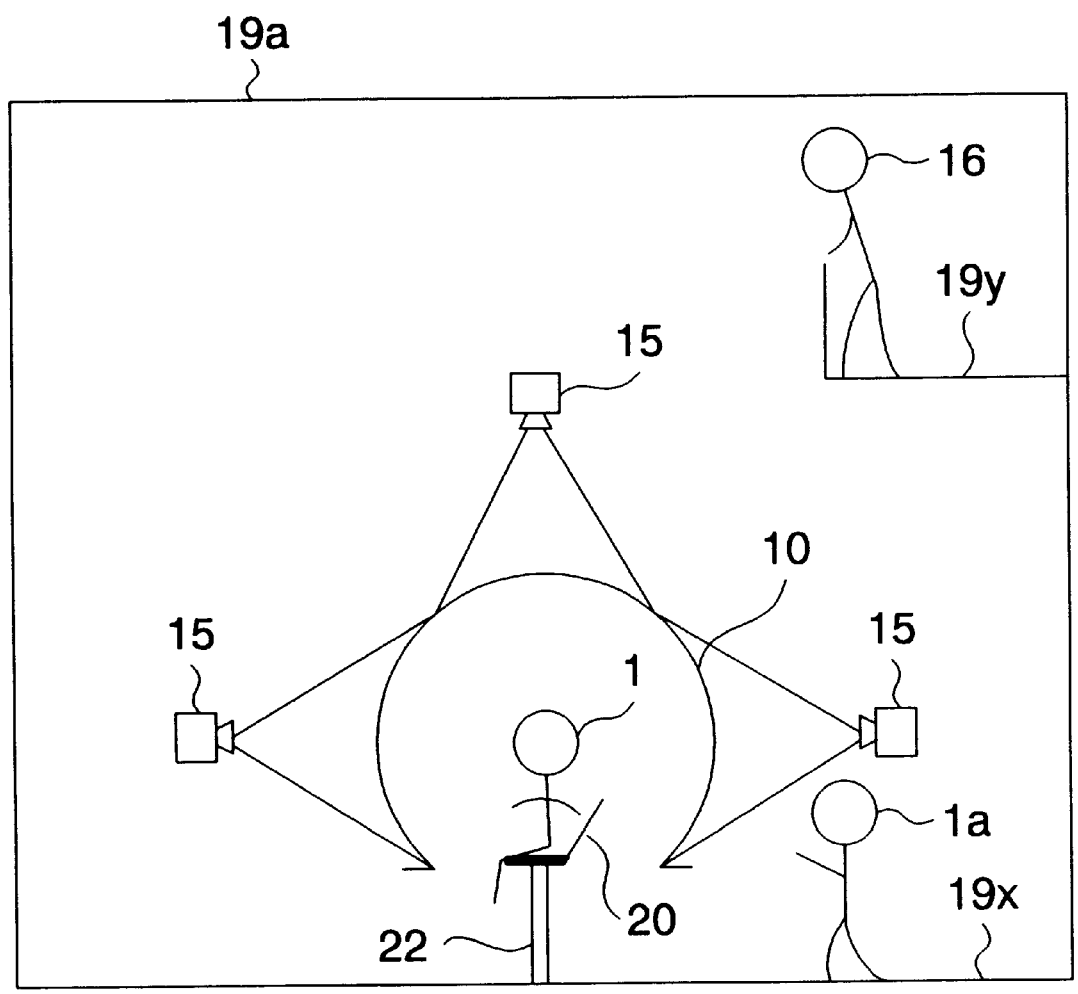
FIG. 8 is a constitutional explanatory view of a system for sensation according to a second embodiment of the present invention.

A second embodiment of a system for sensation according to the invention is described referring to FIG. 8.

The second embodiment is the same as the first embodiment, except the matter that an outer frame 19a is mounted outside the substantially spherical translucent screen 10 for securing spaces 19x and 19y in which other viewers 1a and 1b can stand. The outer frame 19a of the second embodiment is slightly larger than the outer frame of the first embodiment. In the outer frame 19a, standing view spaces 19x and 19y are formed at a lower part and an upper part outside the translucent screen 10, respectively, which do not interrupt image beams from the projectors 15.

The viewer 1a on the lower standing view space 19x and the viewer 1b on the upper standing view space 19y can see a reverse image of the image viewed by the viewer 1 inside the translucent screen 10 from the side of the translucent screen 10 and obliquely from above the translucent screen 10, respectively. Therefore, in such a system for sensation employed, for example, in an amusement park or the like, when a child or the like is seated as the primary viewer 1 in the translucent screen 10, and parents, guardians or companions of the primary viewer 1 wait for the primary viewer 1 outside the translucent screen 10, the second viewers 1a and 1b as the guardians, companions or the like can see the image similar to the image the primary viewer 1 is seeing and their boredom while waiting for their child or the like is relieved.

Figure 9:
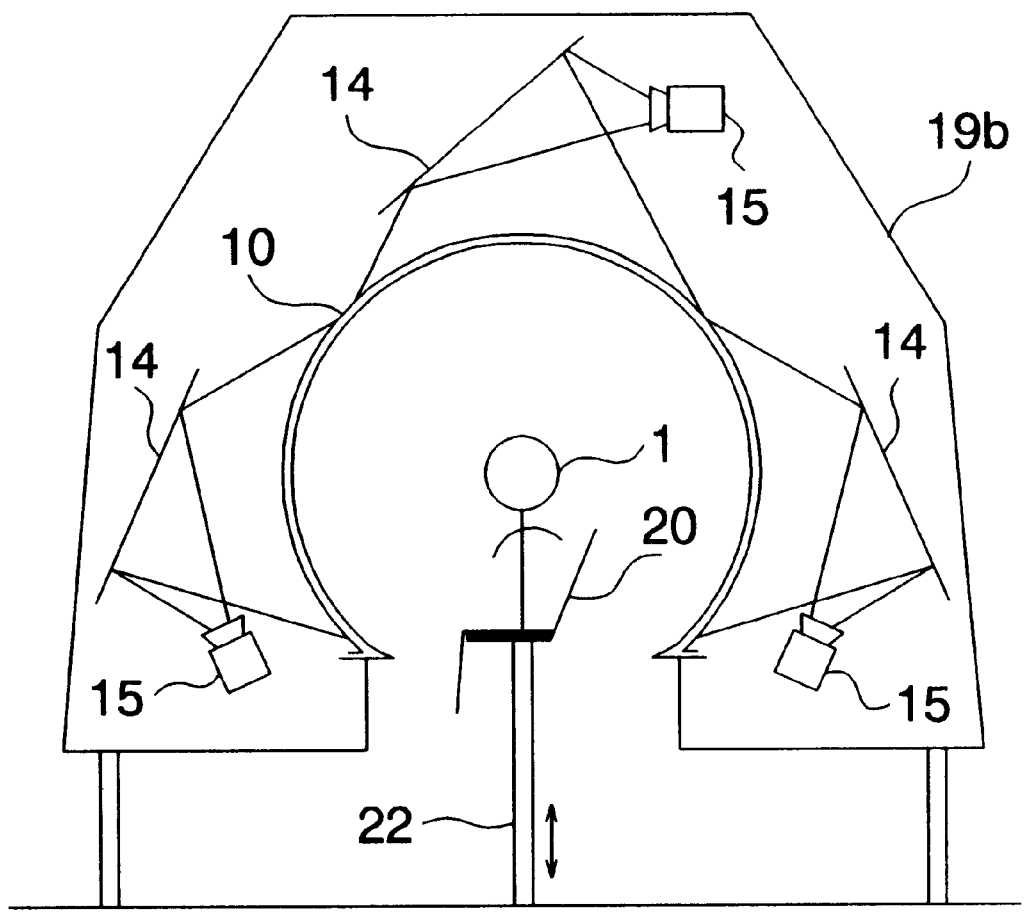
FIG. 9 is a constitutional explanatory view of a system for sensation according to a third embodiment of the invention.

A third embodiment of a system for sensation according to the invention is described referring to FIG. 9.

In the third embodiment, for the respective projectors 15, reflective mirrors 14 are installed between the projectors 15 and the substantially spherical translucent screen 10. When the reflective mirrors 14 are installed in this manner, the projectors 15 can be positioned closer to the translucent screen 10 without changing an optical path length of an image. Therefore, an outer frame 19b for covering these can be miniaturized. The miniaturization of the outer frame 19b is very effective when the system for sensation is newly installed in the existing relatively small space.

Further, as in the third embodiment, when the reflective mirrors 14 are present in the optical path of the image, the image is reversed. Therefore, images from the projectors 15 need to be reversed beforehand. Also, the reflective mirrors 14 of the embodiment have a plane configuration, but can be replaced with spherical reflective mirrors.

Figure 10:
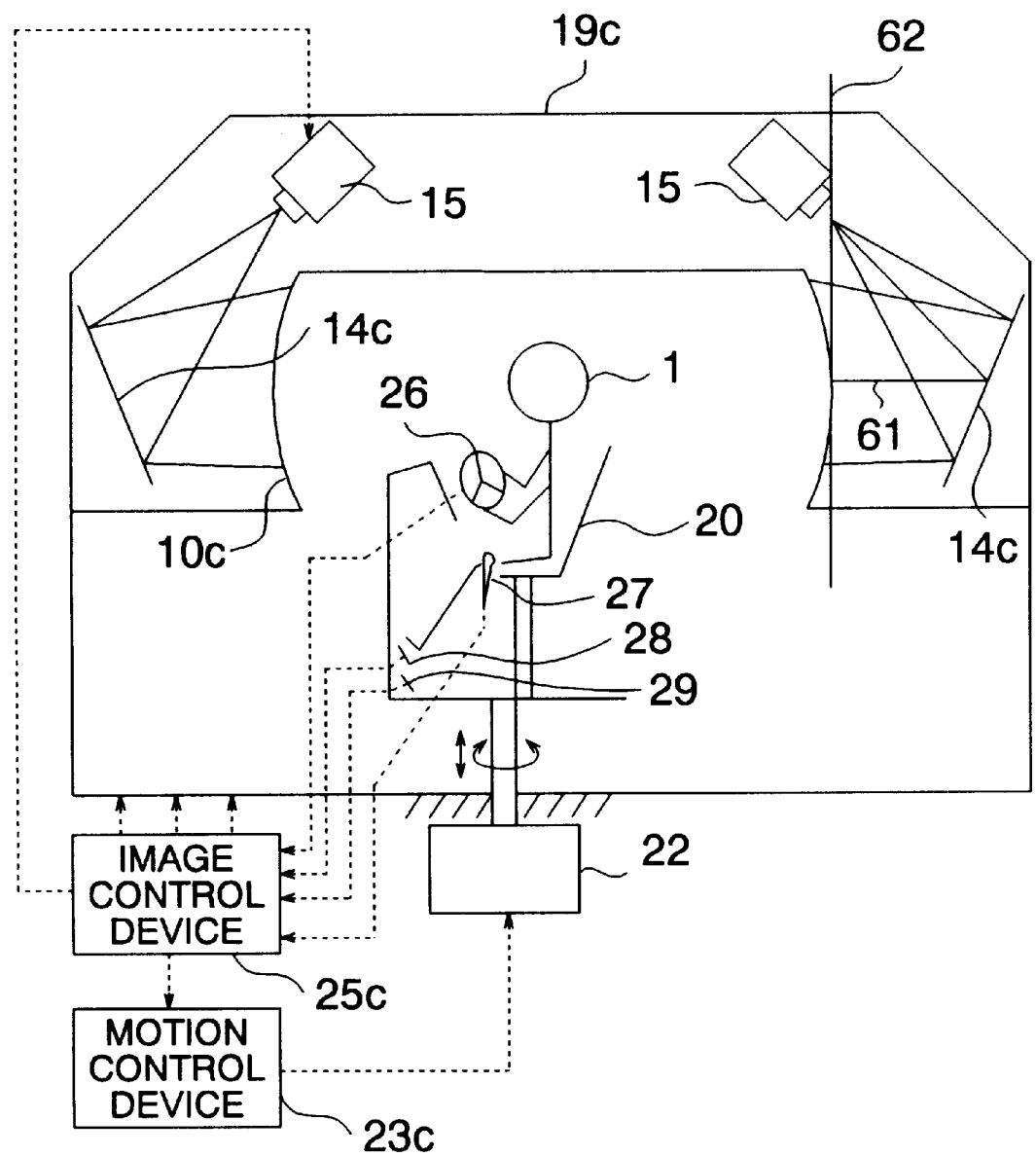
FIG. 10 is a constitutional explanatory view of a system for sensation according to a fourth embodiment of the invention.

A fourth embodiment of a system for sensation according to the invention is described referring to FIG. 10.

The system for sensation of the fourth embodiment is used as a simulator especially for automobile drive training or racing. In the same manner as the first embodiment, the system for sensation is provided with a substantially spherical translucent screen 10c, a plurality of projectors 15, an image control device 25c for controlling respective images projected by the projectors 15, an outer frame 19c for covering the substantially spherical translucent screen 10c and the projectors 15, the seat 20 disposed at the viewer's predetermined position, the motion drive device 22 for moving the seat 20 and a motion control device 23c for controlling the motion drive device 22. Further, the system for sensation of the embodiment is provided with reflective mirrors 14c disposed in the image optical path, a wheel 26 operated by the viewer 1, an accelerator pedal 28, a brake pedal 29 and a shift lever 27.

The translucent screen 10c is developed with respect to the viewer's predetermined position as a center at 360° in a horizontal plane and at 50° in a vertical plane, and forms a mathematically continuous, substantially spherical configuration. As in the fourth embodiment, when the system for sensation is used for automobile drive training, a view which the viewer sees over automobile windows may be reproduced as an image. Therefore, the development range of 50° of the screen 10c in the vertical plane is sufficient. Also, during drive, a driver does not directly see a rear side, or sees the rear side through a rear view mirror or a side mirror. Therefore, by projecting the view of the rear side at positions where the rear view mirror and the side mirror can exist, the development range of the translucent screen 10c in the horizontal plane with respect to the viewer's predetermined position may be 180°.

The image control device 25c is connected via a signal conductor with the wheel 26 operated by the viewer 1, the accelerator pedal 28, the brake pedal 29 and the shift lever 27, and changes an image signal to be transmitted to the projectors 15 so as to change an image in accordance with operated amounts of these connected components. Also, the motion drive device 23c vertically moves and/or horizontally rotates the seat 20 synchronously with changes in an image projected on the translucent screen 10c.

As aforementioned, since the fourth embodiment is the same in basic constitution of the projecting system as the aforementioned embodiments, the viewer 1 can obtain a high feeling of presence. Further in the fourth embodiment, an image changes in accordance with the operated amount of an operation end of the handle 26 or the like, and the seat 20 moves synchronously with the change in image. Therefore, the viewer can have a condition very close to the condition where he actually drives a car.

Also, in the fourth embodiment, since image beams from the projectors 15 are reflected by the reflective mirrors 14c, the projectors 15 can be positioned closer to the translucent screen 10c, and the outer frame 19c can be miniaturized. Especially, in the fourth embodiment, the projectors 15 are positioned in a horizontal direction closer to the viewer than a virtual plane 62 in contact with an intersection of optical axes 61 of the image beams from the projector 15 and the translucent screen 10c, and positioned in a vertical direction very close to the translucent screen 10c. Therefore, the outer frame 19c can be made compact. For example, when the height of the translucent screen 10c is less than 3 m, by arranging the projectors 15 and the reflective mirrors 14c according to the embodiment, the distance from a top face of the translucent screen 10c to the outer frame 19c in the upper direction can be reduced to less than 1 m. Even if the height of 1 m of the motion drive device 22 is added, the height of the entire system for sensation can be less than 5 m. Consequently, even in the existing general building, the system for sensation can be installed.

Figure 11:
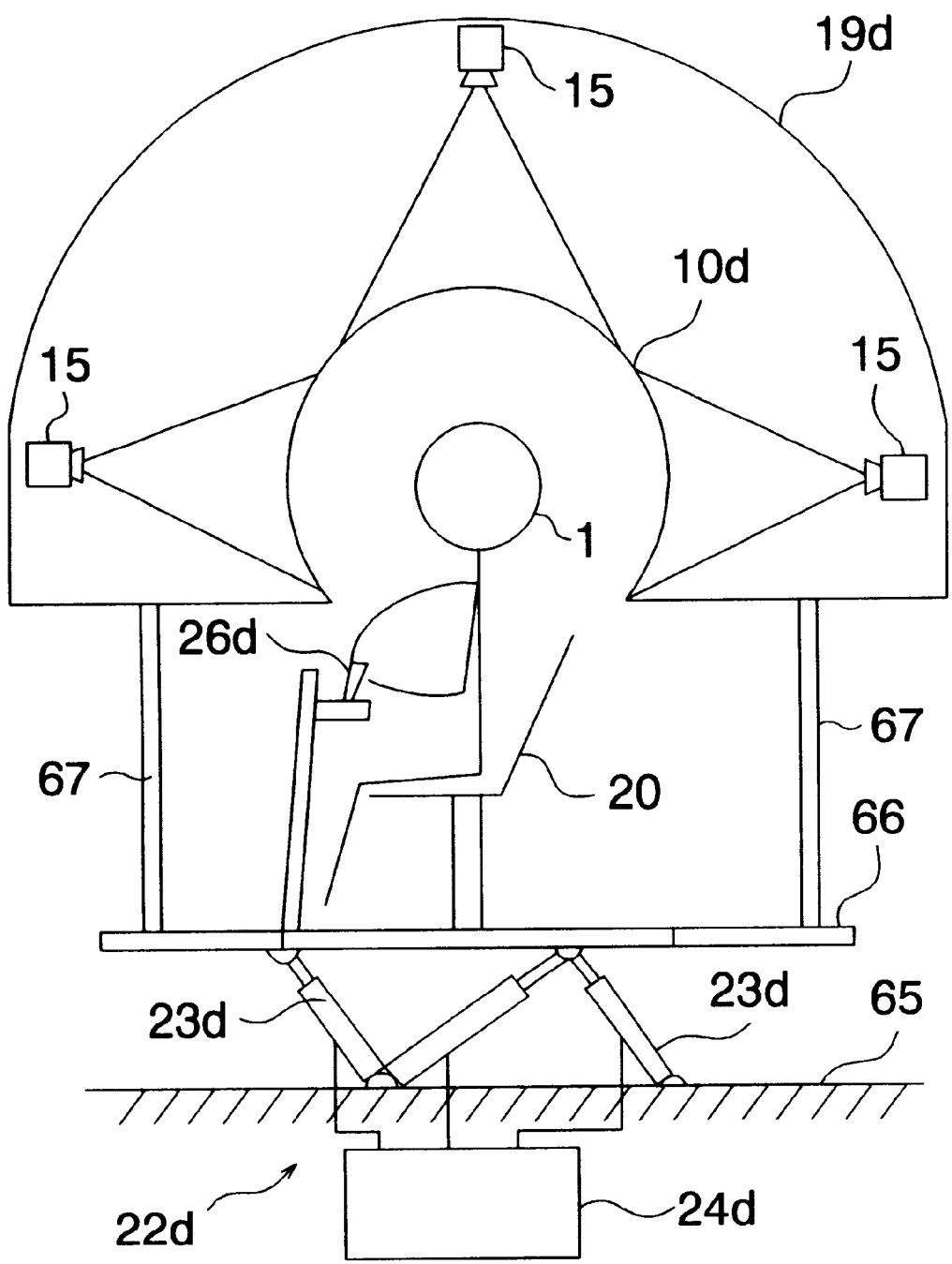
FIG. 11 is a constitutional explanatory view of a system for sensation according to a fifth embodiment of the invention.
Figure 12:
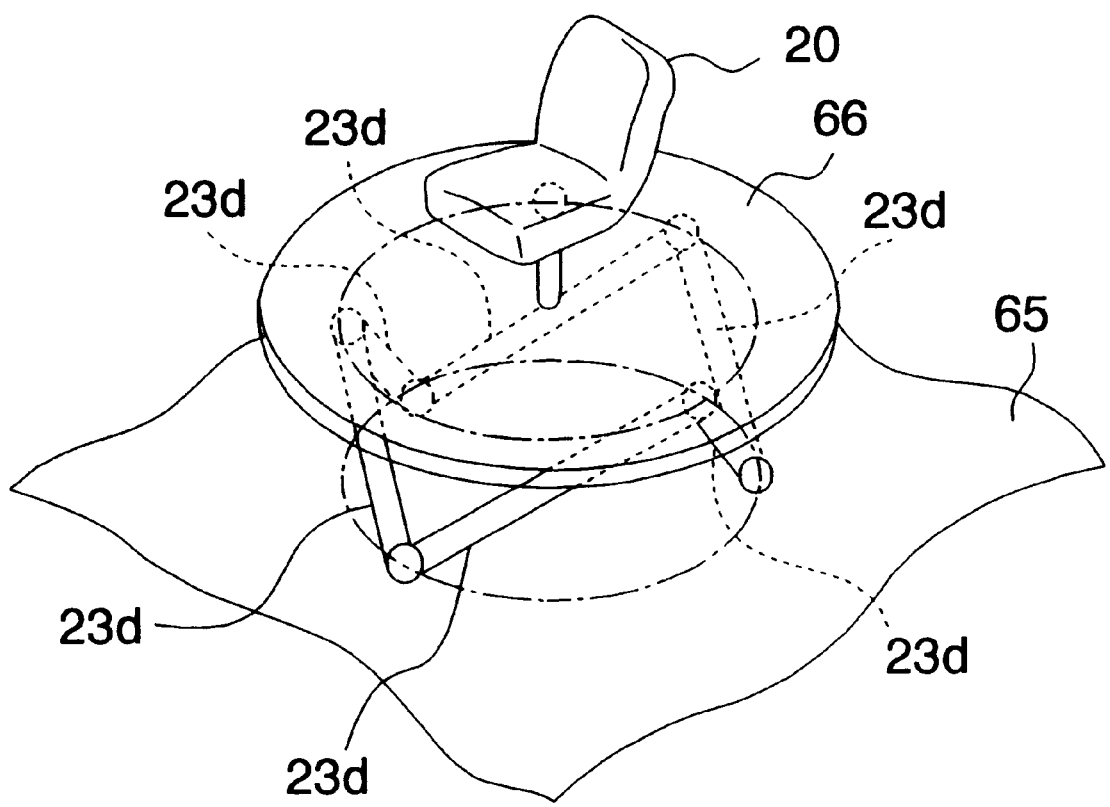
FIG. 12 is a perspective view of a motion drive device and a seat in the system for sensation according to the fifth embodiment.

A fifth embodiment of a system for sensation according to the invention is described referring to FIGS. 11 and 12.

The system for sensation of the fifth embodiment is, in the same manner as the first embodiment, as shown in FIG. 11, provided with a substantially spherical translucent screen 10d, a plurality of projectors 15, an image control device (not shown) for controlling respective images projected by the projectors 15, an outer frame 19d for covering the substantially spherical translucent screen 10d and the projectors 15, the seat 20 disposed at the viewer's predetermined position, a motion drive device 22d for moving the seat 20 and a motion control device (not shown) for controlling the motion drive device 22d. Further, the system for sensation of the embodiment is provided with an operation floor 66 on which the seat 20 is laid and an operation lever 26d operated by the viewer 1.

The operation floor 66 is positioned several 10 cm higher than an actual floor 65. At a central portion of the operation floor 66, the seat 20 and the operation lever 26d are attached. Further, the translucent screen 10c and the outer frame 19d are fixed via a plurality of posts 67 to the operation floor 66.

The motion drive device 22d have six hydraulic cylinders 23d and a hydraulic circuit 24d for supplying drive oil into the hydraulic cylinders 23d. Respective cylinder cases of the six hydraulic cylinders 23d are, as shown in FIG. 12, supported with pins at three points on a virtual circle with respect to a position of the seat 20 along a vertical line on the floor 65. The three points on the virtual circle are at equal intervals, and at each point the cylinder cases of two of the six hydraulic cylinders 23d are supported with a pin. Also, respective operation ends of the six hydraulic cylinders 23d are supported with pins on three points on a virtual circle with respect to a position of the seat 20 along a lower vertical line on the operation floor 66. The three points on the virtual circle are also at equal intervals, and at each point the operation ends of two of the six hydraulic cylinders 23d are supported with a pin. Therefore, the operation floor 66 can be vertically moved, twisted, tilted or displaced otherwise by operation of each of the six hydraulic cylinders 23d. Specifically, displacement with six degrees of freedom can be achieved. In this manner, since the operation floor 66 is displaced, the seat 20, the operation lever 26d, the translucent screen 10d and the outer frame 19d mounted on the operation floor 66 can also be displaced accompanying displacement of the operation floor 66.

Specifically, in the aforementioned embodiments, the translucent screen and the outer frame are fixed in an installation room, but the fifth embodiment is largely different from the aforementioned embodiments in that the translucent screen 10d and the outer frame 19d are displaced together with the seat 20. However, the fifth embodiment is the same in basic constitution of the projecting system as the aforementioned embodiments. Therefore, a high feeling of presence is given to the viewer 1, or the same other effects as in the aforementioned embodiments can be provided.

Further, in the fifth embodiment, since the seat 20 does not move relative to the translucent screen 10d, in the substantially spherical translucent screen 10d, a movement space in which the viewer 1 moves together with the seat 20 needs not to be secured. For this, an outer diameter of the substantially spherical translucent screen 10d can be made small. As a result, the outer frame 19d can be made small.

Figure 13:
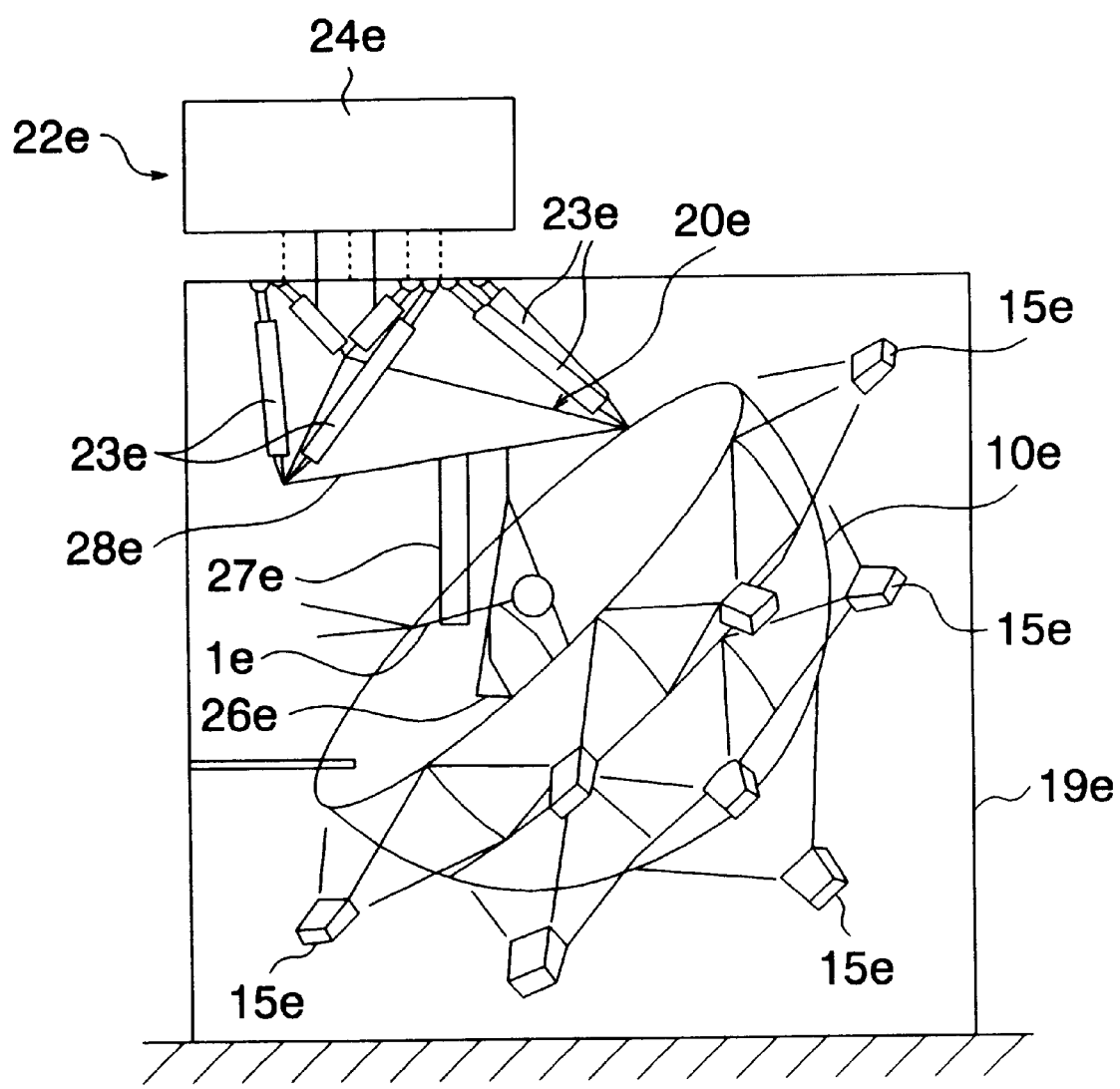
FIG. 13 is a constitutional explanatory view of a system for sensation according to a sixth embodiment of the invention.

A sixth embodiment of a system for sensation according to the invention is described referring to FIG. 13.

The system for sensation of the sixth embodiment is a simulator especially for a hang glider. In the same manner as the first embodiment, the system for sensation is provided with a substantially spherical translucent screen 10e, a plurality of projectors 15e, an image control device (not shown) for controlling respective images projected by the projectors 15e, and an outer frame 19e for covering the substantially spherical translucent screen 10e and the projectors 15e. Further, the system for sensation is provided with a hang glider 20e, a motion drive device 22e for moving the hang glider 20e and a motion control device (not shown) for controlling the motion drive device 22e.

The translucent screen 10e has a mathematically continuous, substantially spherical configuration, and is developed from the viewer's predetermined position as a center at 360° in an about 45° tilted plane relative to a horizontal plane and at 180° in a vertical plane relative to the tilted plane.

In the sixth embodiment, thirteen projectors 15e are used. When the number of the projectors 15e is increased in this manner, a projecting size of one projector 15e onto the translucent screen 10c is reduced and a projecting distance is shortened. Therefore, the outer frame 19e can be made small.

The hang glider 20e has a sail 28e, a harness 27e for supporting a viewer 1e and a control bar 26e held by the viewer 1e. When inputting the displacing instructions for the harness 27e from the control bar 26e, the not-shown image control device changes an image in accordance with a displacing amount of the control bar 26e and a predetermined wind to be received by the hang glider 20e, while controlling the motion drive device 22e.

In the same manner as the fifth embodiment, the motion drive device 22e has six hydraulic cylinders 23e and a hydraulic circuit 24e for supplying drive oil into the respective hydraulic cylinders 23e. Respective cylinder cases of the six hydraulic cylinders 23e are supported with pins on a top plate of the outer frame 19e, and respective operation ends of the six hydraulic cylinders 23e are supported with pins on the sail 28e of the hang glider 20e. Therefore, the hang glider 20e is displaced with six degrees of freedom.

As aforementioned, the sixth embodiment is different from the other embodiments in that the translucent screen 10e is tilted relative to the horizontal plane. However, the sixth embodiment is the same in basic constitution of the projecting system as the other embodiments. Therefore, a high feeling of presence is given to the viewer 1e, or the other same effects as in the other embodiments can be provided.

Further, in the sixth embodiment, the translucent screen 10e does not move relative to the outer frame 19e and a installation space, but in the same manner as the fifth embodiment, the translucent screen 10e may be displaced together with the hang glider 20e.

In the aforementioned embodiments, the motion drive devices 22, 22d and 22e are of a hydraulic drive type, but the invention is not restricted to the embodiments. For example, the motion drive device can be of an electric drive type.

According to the invention, since the projectors are positioned around the outer periphery of the substantially spherical translucent screen, without interrupting the sight range of the viewer, an image extended beyond the visually recognized range of the viewer can be shown to the viewer. Whether the viewer sees or does not see, an image is projected in either direction. Therefore, even when the viewer moves his head and changes a viewing direction, no time lag is produced in an image in response to a change in the viewing direction of the viewer, which is different from the HMD. Also, in the invention, since the substantially spherical translucent screen is mathematically continuous and has no bent portions, an image projected on the screen can also secure a continuity. Further, since the projector for a three-dimensionally curved translucent screen is used, an image which has a continuity and is clear to all corners can be shown to the viewer.

In this manner, according to the invention, an image which has a continuity, is clear to all corners and extended beyond the visually recognized range of the viewer is projected without interrupting the sight range of the viewer. Therefore, a remarkably high feeling of presence can be given to the viewer.

The invention can be operated in modes other than the aforementioned embodiments without departing from the spirit and major characteristics. Therefore, the aforementioned embodiments have been simply illustrated in all respects and should not be interpreted in a restricted manner. The scope of the invention is recited in claims. Further, modifications and alterations falling in the scope of the appended claims are within the scope of the invention.

What is claimed is:

1. A projector for projecting an image which comprises:
   (a) an image source having an image display face on which an image is displayed;

(b) a projecting lens for enlarging and forming an image projected on said image display face; and (c) an optimum image face projected by said projector having a convex configuration at a side of the projector;

wherein, when a curvature of said image display face of said image source is set as H, a curvature of the image display face projected on a plane by said projecting lens is L and a curvature of the optimum image face projected by said projector is S, a relationship $$S=A\times(H-L)$$

is established in which H>L and A is a constant in a range of 0.50 to 0.78.

2. A projecting system which comprises:

(a) a projector provided with an image source having an image display face on which an image is displayed and a projecting lens for enlarging and forming an image projected on said image display face, a projected optimum image face having a convex configuration at a side of the projector; and (b) a screen having a convex configuration toward the side of said projector, on which an image from said projector is formed;

wherein, when a curvature of said image display face of said image source is set as H, a curvature of the image display face projected on a plane by said projecting lens is L and a curvature of the optimum image face projected by said projector is S, a relationship $$S=A\times(H-L)$$

is established in which H>L and A is a constant in a range of 0.50 to 0.78.

3. A projecting system which comprises:

(a) a projector provided with an image source having an image display face on which an image is displayed and a projecting lens for enlarging and forming an image projected on said image display face, a projected optimum image face having a convex configuration at a side of the projector; and (b) a substantially spherical screen having a convex configuration toward the side of said projector, on which an image from said projector is formed;

wherein, when a curvature of said image display face of said image source is set as H, a curvature of the image display face projected on a plane by said projecting lens is L and a curvature of the optimum image face projected by said projector is S, a relationship $$S=A\times(H-L)$$

is established in which H>L and A is a constant in a range of 0.50 to 0.78.

4. A projecting system according to claim 3 which comprises a plurality of said projectors, said plurality of projectors being disposed opposite to a viewer position with respect to said translucent screen, so that images shared by said projectors are continuous without clearance on said translucent screen.

5. A projecting system according to claim 3, wherein a viewer position is positioned in a space at a side of a concave face of the translucent screen, and said translucent screen is developed from said viewer position as a center at 360° on at least one horizontal plane in a three-dimensional space.

6. A projecting system according to claim 3, wherein said translucent screen has a substantially spherical light transmitting layer and a light dispersing layer formed on a surface of said light transmitting layer opposite to the viewer position with respect to said light transmitting layer.

7. A projecting system according to claim 6, wherein said light transmitting layer is formed of a colored transparent material.

8. A projecting system according to claim 3, wherein a reflective mirror is disposed in an image optical path between said projector and said translucent screen.

9. A projecting system according to claim 8, wherein said projector is partially or entirely positioned at a side of said viewer at an intersection of an optical axis of the image optical path of said projector and said translucent screen, relative to a virtual plane in contact with said translucent screen.

10. A projecting system according to claim 9 which comprises an outer frame for covering said screen and said projector and obstructing external light reaching said translucent screen.

11. A projecting system according to claim 10, wherein between said outer frame and said translucent screen, at a position not interrupting the image optical path of said projector, a space is secured in which another viewer can exist.

12. A system for sensation which comprises:

(a) a projector provided with an image source having an image display face on which an image is displayed and a projecting lens for enlarging and forming an image projected on said image display face, a projected optimum image face having a convex configuration at a side of the projector;

(b) a substantially spherical translucent screen having a convex configuration toward the side of the projector, on which an image from said projector is formed;

(c) a seat at which a viewer is seated;

(d) a motion drive device for displacing said seat;

(e) a motion control device for controlling operation of the motion drive device; and (f) an image control device for controlling an image projected by said projector and instructing said motion drive device to displace said seat in accordance with a change in said image;

wherein, when a curvature of said image display face of said image source is set as H, a curvature of the image display face projected on a plane by said projecting lens is L and a curvature of the optimum image face projected by said projector is S, a relationship $$S=A\times(H-L)$$

is established in which H>L and A is a constant in a range of 0.50 to 0.78.

13. A system for sensation according to claim 12, wherein said image control device has an operation means operated by the viewer, and a constitution for changing an image projected by said projector in accordance with an operation amount of said operation means and instructing said motion drive device to displace said seat in accordance with the change in said image.

14. A system for sensation which comprises:

(a) a projector provided with an image source having an image display face on which an image is displayed and a projecting lens for enlarging and forming an image projected on said image display face, a projected optimum image face having a convex configuration at a side of the projector;

(b) a substantially spherical translucent screen having a convex configuration toward the side of the projector, on which an image from said projector is formed;
(c) a seat at which a viewer is seated;
(d) an operating portion operated by said viewer; and
(e) an image control device for changing an image projected by said projector in accordance with an operation amount of said operating portion;

wherein, when a curvature of said image display face of said image source is set as H, a curvature of the image display face projected on a plane by said projecting lens is L and a curvature of the optimum image face projected by said projector is S, a relationship $$S = A \times (H - L)$$

is established in which H>L and A is a constant in a range of 0.50 to 0.78.

* * * * *